Oct. 27, 1959 J. R. PHIN 2,910,167
INFEED MECHANISM
Filed Sept. 22, 1958 3 Sheets-Sheet 1

INVENTOR
JAMES R. PHIN
BY
Douglas S. Johnson
ATTY.

Oct. 27, 1959  J. R. PHIN  2,910,167
INFEED MECHANISM
Filed Sept. 22, 1958  3 Sheets-Sheet 2
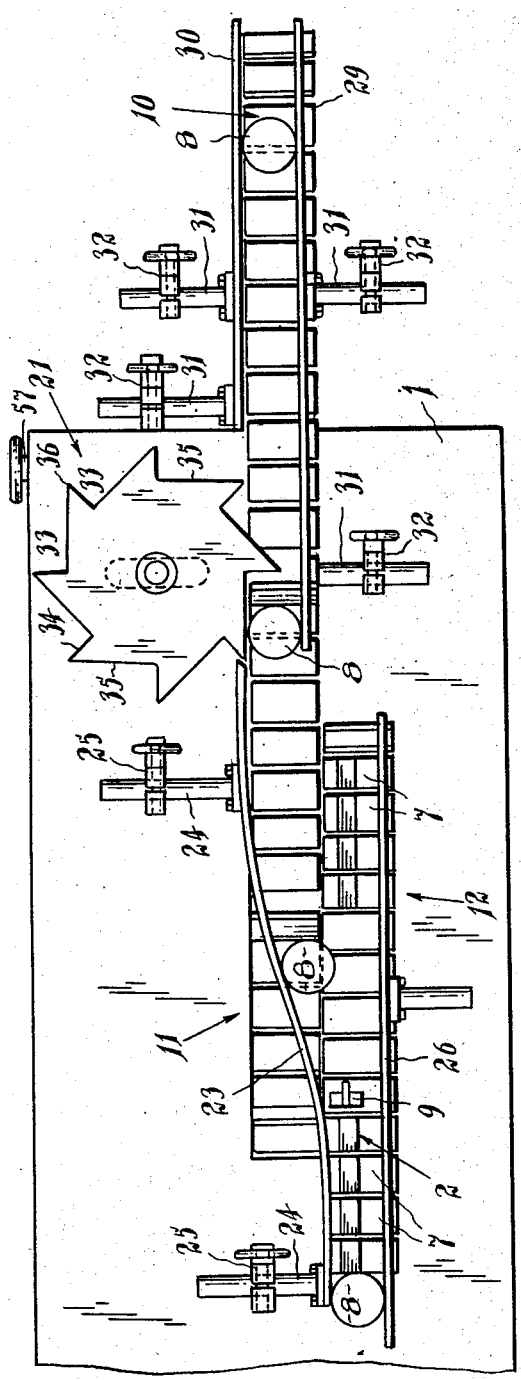
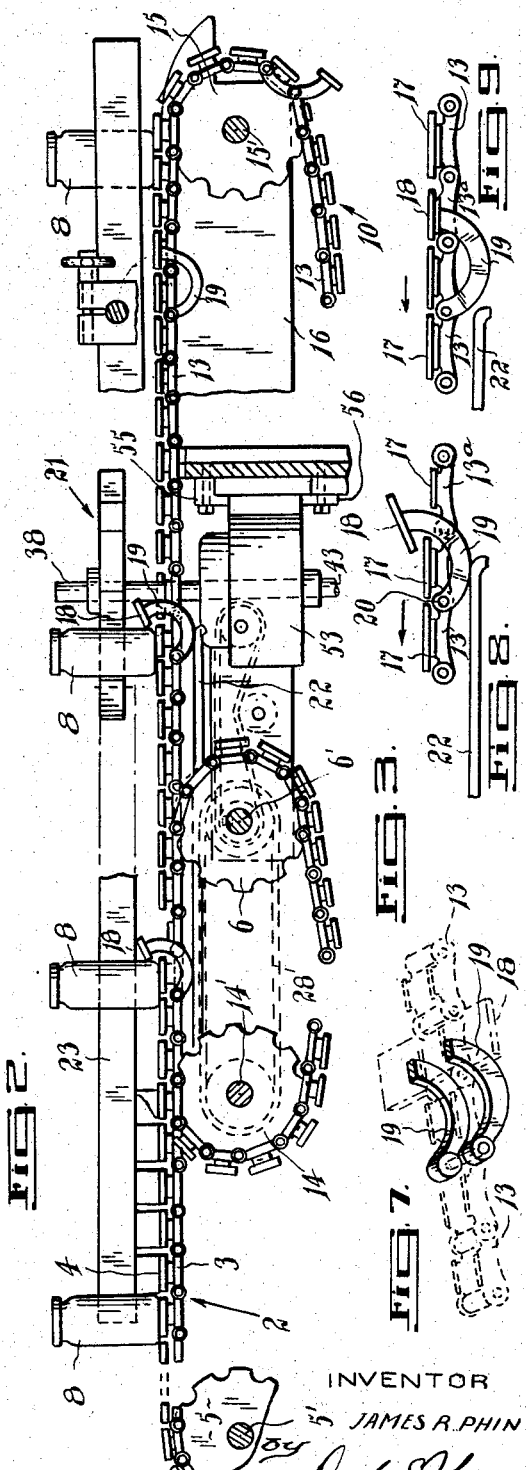
INVENTOR
JAMES R. PHIN
ATTY.

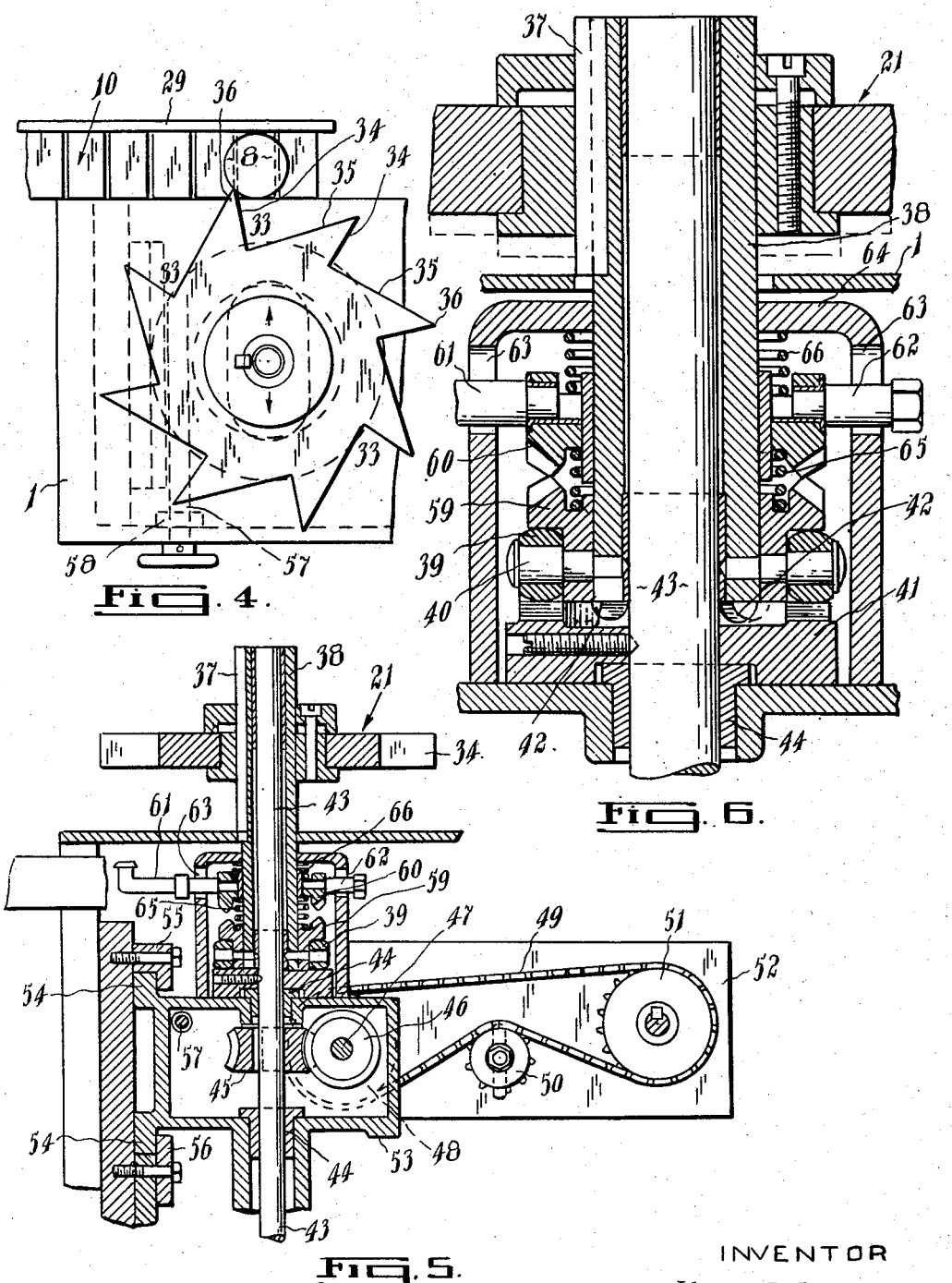

United States Patent Office 2,910,167
Patented Oct. 27, 1959

2,910,167

INFEED MECHANISM

James R. Phin, Toronto, Ontario, Canada, assignor to Universal Labelling Machines Limited, Toronto, Ontario, Canada Application September 22, 1958, Serial No. 762,419

19 Claims. (Cl. 198—34)

This invention relates to an infeed mechanism for delivering containers such as jars, bottles, cans or the like to an operating machine for instance a labelling machine such as disclosed in U.S. Patent No. 2,681,743 or a filling, capping or other machine in which the containers are labelled filled, or acted upon while being moved through the machine.

The principal object of this invention is to provide a highly versatile infeed mechanism which will automatically and positively deliver the containers to the operating machine in precise synchronism with the machine operation.

Another important object is to provide an infeed as aforesaid which will handle containers of a wide variety of shapes and sizes and can be employed with containers of glass and plastic as well as metal to positively control their infeed without danger of breakage.

Still another important object is to provide an infeed mechanism which will be actuated from the main machine so that it will be automatically adjusted to maintain synchronism upon adjustment of the timing or speed of the main machine.

Again it is an object to provide an infeed mechanism which will be capable of directly receiving the containers from a production line and will feed down to the last container delivered into the infeed conveyor.

Still a further object is to enable the rejection of containers which have a wide divergence in size from the containers being delivered or which for instance have fallen over when upright containers are being delivered.

The principal feature of the invention resides in providing a novel conveyor arrangement in conjunction with a timing device whereby containers are frictionally advanced at random to an admittance point and are then passed through the admittance point in proper timed relation to the main machine whereupon the containers are then positively advanced so that they will not lose their proper timed relation until actually delivered to the machine.

More particularly according to the invention the conveyor comprises an endless chain with the links of the chain carrying platform elements whereby in operation the conveyor comprises an endless moving articulated platform characterized in that certain of the platform elements are shiftably mounted for movement up out of the plane of the conveyor, and means are provided to effect shifting of such shiftable platform elements, the shiftably supported elements having a predetermined relative spacing along the length of the conveyor.

Another important feature resides in arranging the infeed conveyor to extend parallel to the main machine conveyor, for instance, in a labelling machine whereby the machine can be employed in essence as a continuation of the assembly line conveyor, and employing in conjunction with the positive container feed a transfer rail for transferring the containers from one conveyor to the other in proper timed relation.

In accordance with the preferred form of the invention, the timing device comprises a pocket wheel rotatable into the path of containers being frictionally fed along the infeed conveyor to transfer the leading containers through the admittance point while holding back subsequent containers.

More particularly according to the invention the pocket wheel is shaped so that at the instant of container selection it presents one wall, parallel to direction of infeed conveyor travel and a substantially perpendicular wall extending inwardly across the infeed conveyor and terminating in a container detecting and separating point, and the pocket wheel is adjustably mounted to move transversely of the infeed conveyor.

Another important feature resides in driving the pocket wheel and infeed conveyor from the main machine conveyor and more particularly driving the pocket wheel through a clutch device which is adapted to cam the pocket wheel upwardly and effect locking of the pocket wheel against rotation to jam an improperly timed container and prevent its feed.

These and other objects and features will be appreciated on reading the following specification in conjunction with the sheets of drawings in which:

Figure 2 is a plan view of the infeed mechanism of Figure 1;

Figure 3 is a longitudinal vertical sectional view partly broken away of the infeed conveyor and infeed end of the main conveyor;

Figure 4 is an enlarged plan detail of the timing or pocket wheel;

Figure 5 is a vertical sectional detail of the pocket wheel and drive therefor;

Figure 6 is an enlarged fragmentary vertical section illustrating the pocket wheel drive and showing the pocket wheel in an elevated locked position;

Figure 7 is a perspective view partly in phantom showing the construction of the infeed conveyor;

Figure 8 is a part side elevational part diagrammatic view illustrating the manner in which the pivotal conveyor platforms are elevated on infeed conveyor travel under camming action;

Figure 9 is a view similar to Figure 8 but showing the normal position of the pivotally supported platform prior to camming.

Figure 1:
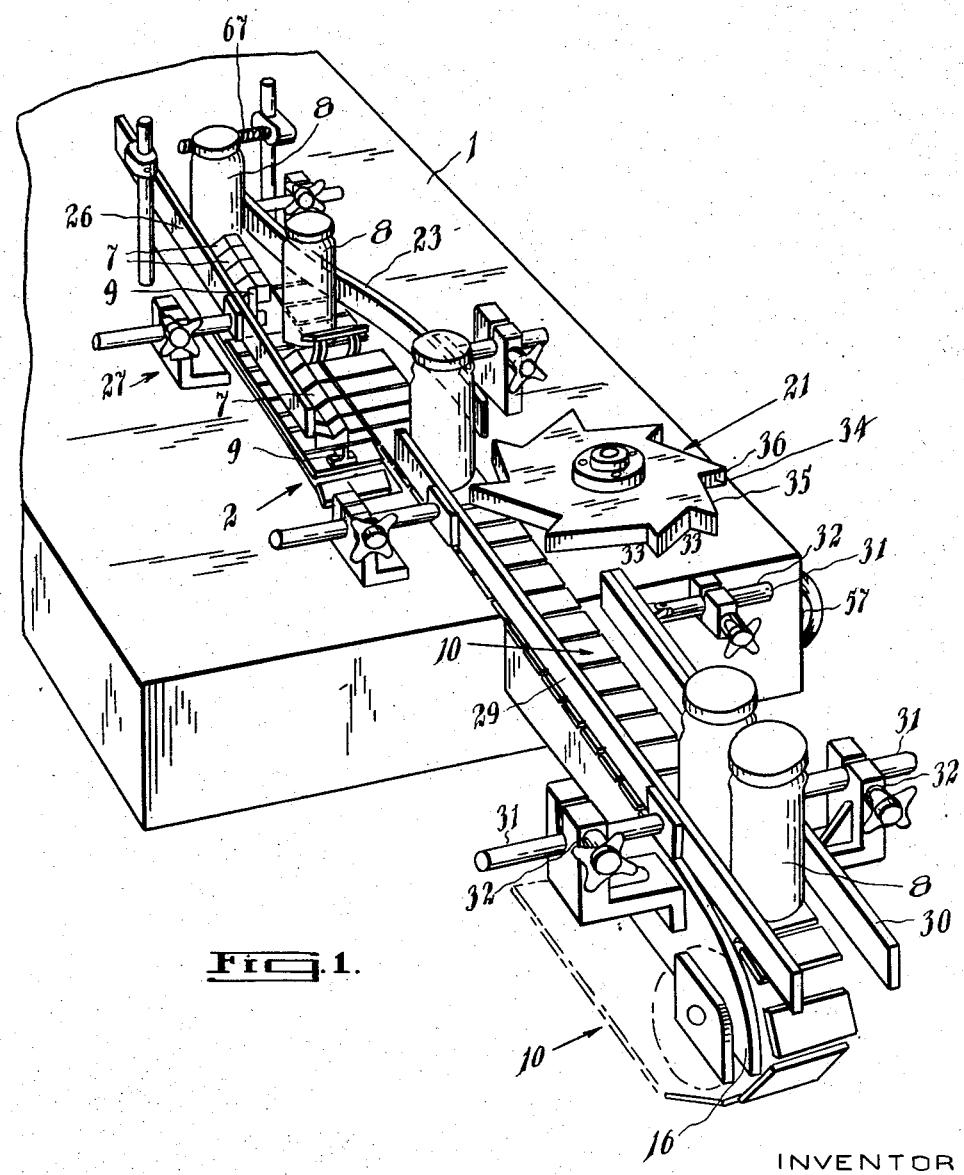
Figure 1 is a fragmentary perspective view illustrating an infeed mechanism embodying the invention arranged to deliver containers to a main machine conveyor.

With reference first to Figures 1 and 2, the machine with which the infeed conveyor mechanism of the present invention is shown associated for purposes of explanation is a labelling machine of the type for instance shown in U.S. Patent No. 2,681,743. As illustrated this machine comprises a main frame in the form of a platform 1 suitably supported which in turn supports a main conveyor 2 which as shown comprises an endless flat top conveyor chain formed of links 3 carrying platform elements 4.

The main conveyor is driven through any suitable drive not shown with the conveyor chain meshing with sprocket wheels 5 and 6 mounted on shafts 5' and 6'.

In the particular application of the machine illustrated, certain of the paltform elements 4 are provided with V-blocks 7 which are adapted to receive containers 8 thereon as hereinafter more fully explained and at the rearward end of these V-blocks 7 are arranged projecting stops 9 to insure that the containers are positively advanced by the main conveyor.

The infeed mechanism comprises an infeed conveyor 10 which is generally of the same construction as the main conveyor 2 and this infeed conveyor is arranged to extend parallel to the main conveyor 2 with its discharge end designated as 11 in side by side overlapping relation with the infeed end 12 of the main conveyor. As in the case of the main conveyor the infeed conveyor comprises chain links 13 pivotally connected together and meshing with sprocket wheels 14 and 15 supported on shafts 14' and 15', the shaft 14' being suitably supported from the frame of the machine and the shaft 15' being supported between side plates 16 extending outwardly from the frame of the machine.

The majority of the links 13 carry platform elements 17 rigidly connected thereto but certain of the links 13a do not have such platforms and instead these links support when they are disposed on the upper reach of the conveyor shiftable platform elements 18 carried by arcuate arms 19 pivoted on the pivot connection 20 between adjoining links 13. As illustrated in Figure 3 when the links 13a are at the under side of the conveyor 10 that is when they are disposed in the lower reach of the conveyor, these shiftable or pivotal elements 18 hang downwardly but when the links 13a reach the upper surface of the conveyor, that is the upper conveyor reach, they rest under gravity on the links 13a in the plane of the upper conveyor surface.

Located adjacent to the discharge end 11 of the infeed conveyor is a timing device in the form of a "pocket wheel" 21. At the under side of the upper reach of the conveyor 10 on the discharge end side of the timing device 21 is a cam 22 which on movement of the infeed conveyor to move the upper reach thereof from right to left as seen in Figure 3 engages the arcuate arms 19 of the pivotal platform elements 18 to effect pivoting of such arms which in turn elevates the platform elements 18 to a position where they project above the upper surface of the infeed container to form push elements to positively deliver the containers 8 along the discharge end portion of the infeed conveyor. A curved camming or transfer rail 23 extending generally diagonally across the discharge end of the infeed conveyor is arranged to guide the containers 8 being positively fed by the elevated platform elements 18 progressively laterally across from the discharge end of the infeed conveyor onto the infeed end of the main conveyor 2 as shown particularly in Figure 2.

The transfer rail 23 is carried by horizontal bars 24 which are adjustably secured in clamps 25 for movement transversely of the lengths of the conveyors 2 and 10, and the main conveyor 2 is provided with a guide rail 26 similarly supported by corresponding supports designated at 27 for adjustment transversely of the main conveyor so that the separation at the terminal point of the transfer rail 23 and the guide rail 26 on the main conveyor can be adjusted to correspond to the size of container 8 being delivered to the main machine.

The drive to the infeed conveyor 10 is achieved through a suitable chain drive 28 driving between the shaft 6' of the main conveyor and the shaft 14' of the infeed conveyor so that the infeed conveyor can be maintained always in synchronism with the main conveyor and the arrangement is such that the elevatable platform elements 18 will be immediately in advance in the direction of conveyor travel of the main conveyor V-blocks 7 so that the transfer rail 23 will deliver the containers 8 on the main conveyor 2 immediately in advance of these V-blocks.

The infeed conveyor 10 is provided with guide rails 29 and 30, the guide rail 29 being disposed on the opposite side of the infeed conveyor from the timing device 21 and extending substantially to the main conveyor 2. The opposing guide rail 30 is somewhat shorter leaving a gap between the end of this guide rail and the transfer rail 23 for the operation of the timing device 21 therebetween. Again these rails are carried by horizontal bars 31 adjustably supported for movement transversely of the infeed conveyor by means of clamp devices designated at 32.

The timing device or pocket wheel and its operating parts will be best seen in Figures 4 to 6. As shown this device comprises a wheel of a special shape having "pockets" designated at 33 defined by a short generally radially extending wall 34 and a longer right angularly extending wall 35. The walls 34 and 35 of adjoining pockets meeting at a point 36. As shown in Figure 2 the relationship is such that when the radial wall 34 is in a position extending at right angles to the length of the infeed conveyor that is in a position to bring the point 36 into closest proximity to the guide rail 29 opposite thereto, the pocket wall 35 will be substantially parallel to the guide rail 29, the pocket wheel being adjustable as hereinafter more fully explained transversely of the length of the infeed conveyor to select the spacing between such pocket wall 35 and guide rail 29 corresponding to the size of the container being delivered.

The pocket wheel 21 is secured as by means of a key 37 to a sleeve 38 which carries at its lower end rollers 39 journalled on pins 40 suitably fixed to the sleeve. These rollers form one component of a clutch mechanism the mating component of which designated at 41 comprises a ring provided with a series of part circular depressions 42 in the upper surface thereof into which the rollers 39 are adapted to drop when the pocket wheel is being driven. The clutch 41 is anchored to a shaft 43 supported in suitable bearings 44 and this shaft carries a bevelled gear 45 meshing with a bevelled gear 46 mounted on a shaft 47 carrying a sprocket 48 with which meshes a chain 49 passing over an idler sprocket 50 and meshing with a sprocket 51 keyed on the main conveyor shaft 6' to be driven thereby. The sprockets 48, 50 and 51 are carried by an arm 52 secured to a housing 53 carrying the bearings 44 and the remainder of the sprocket wheel mechanism. This housing 53 comprises a slide having flanges 54 engaging beneath co-operating guides 55 and 56 so that the entire pocket wheel assembly carried by the housing 53 can slide transversely of the infeed conveyor 10 to regulate the spacing in accordance with container size between the parallel pocket wall 35 and guide rail 29 when they are in a position as illustrated in Figure 2.

A control screw 57 threadably engaging a nut 58 carried by the housing 53 is arranged to effect operation of the housing in its sliding movement for pocket wheel adjustment in accordance with container size.

Fixed to the sleeve 38 is a toothed member 59 disposed in opposing relation to a fixed correspondingly toothed member 60 which is anchored against rotation by a grease fitting 61 and arm 62 projecting through slots 63 in an upper housing 64 fixed to the housing 53. A spring 65 disposed between the toothed members 59 and 60 acts to urge the lower toothed member 59 downwardly to urge the roller 39 into the recesses 42 to provide drive from the positively driven shaft 47 through the clutch mechanism to the sleeve 38 to drive the pocket wheel. A further spring 66 acting downwardly on the upper toothed member 60 urges the latter toothed member in a direction to engage toothed member 59 but the spring 66 does not have sufficient strength to overcome the spring 65 and effect engagement of the members 59 and 60 while the rollers 39 are resting in the recesses 42.

However upon a jamming of the pocket wheel as for instance when the point 36 of one of the pockets strikes an improperly positioned container to jam it against the bar guide rail 29, the excessive resistance applied to the pocket wheel will effect a camming of the rollers 39 upwardly out of the recesses 42 from the position of Figure 5 to the position of Figure 6 whereupon the toothed member 59 will engage the non-rotatable toothed member 60 to effect a locking of the pocket wheel against rotation until the cause of the jamming has been eliminated. Upon clearing the cause of the jamming the spring 65 will return the rollers into their recesses 42 clearing the member 59 from the member 60 to resume pocket wheel rotation.

In operation the control screw 57 will be set by moving the slidable housing 53 and arm 52 towards or from the guide rail 29 to provide for the admittance of the particular containers to be fed past the timing or pocket wheel 21. In this connection it will be understood that since the sprocket 51 is slidably keyed on the main conveyor shaft 6' and is carried by the arm 52, this adjustment of the pocket wheel can be effected without in any way disturbing the rotational relation between the sprocket wheel 51 and the main conveyor sprocket wheel 6 so that once the sprockets have been set to provide the requisite timing of the admittance of the containers onto the discharge end 11 of the infeed conveyor in synchronism with the main conveyor operation this synchronism will be continually maintained and the timing or pocket wheel 21 will be driven from the main conveyor in the proper synchronized relation.

The containers to be delivered are then introduced onto the infeed conveyor 10 and it will be appreciated that this conveyor may be of any length and may for instance form a part of the conveyor system of an assembly line. Up to the timing or pocket wheel 21 the containers are fed along the infeed conveyor 10 by friction until they reach the pocket wheel and it will be understood that containers may pile up in front of the pocket wheel and the infeed conveyor platform elements 17 and 18 will slide beneath the containers. The synchronized timing or pocket wheel 21 on rotation will cause the foremost container to be separated from the remaining containers with the respective point 36 of the pocket entering behind the foremost container and shoving it onto the discharge end of the infeed conveyor while the remaining containers will be forced to stand in wait should they be piled up against the pocket wheel. Once the pocket wheel has positively advanced the foremost container onto the discharge end of the infeed conveyor then the camming up of one of the pivotal platform elements 18 behind the advanced container will provide a positive pushing force to push the container along the discharge end of the infeed conveyor and despite the drag of the transfer rail 23 which in the absence of the elevated platform element 18 might cause slippage of the infeed conveyor beneath the container, the container is positively transferred onto the main conveyor in proper synchronism immediately in advance of the V-blocks 7. The main conveyor then advances the containers delivered thereto and in the particular application of the main machine illustrated, the container so advanced is arranged to strike a vertically adjustable bar 67 which upsets the bottle so that it comes to rest in a horizontal position on top of the V-blocks 7. It will be understood however that any manipulation of the container desired on the main conveyor may be resorted to as such manipulation is quite independent of the present invention.

In the event that a pile up on the infeed conveyor causes an improper advance of the containers immediately in front of the timing or pocket wheel 21 so that the point 36 of one of the pockets jams a container against the opposing guide rail 29, the pocket wheel will not only come to a halt but will become locked in the stationary position as previously explained to prevent the weight of subsequent containers forcing their way past the admittance point to the discharge end of the infeed conveyor as constituted by the pocket wheel and opposing guide rail 29.

It will be appreciated that the infeed mechanism will handle any shape of container whether round, square or of other form because of the particular shape of the pocket wheel and its adjustability.

It will be noted that with the present invention, the continers are delivered along the infeed conveyor in the same direction as which they are fed on the main conveyor and the very simple transfer mechanism in the form of the transfer rail 23 may be employed in conjunction with the positive container advancing means as constituted by the shiftable platform elements 18 to effect positive container transfer.

Since the infeed mechanism includes a positively driven conveyor and is not dependent on gravity feed, it will be apparent that the mechanism will feed down to the last container on the conveyor and yet properly time the entrance of even the last conveyor on the discharge end 11 of the infeed conveyor. Further, because of the shape of the pockets 33, it will also be apparent that the mechanism will handle any shape of container, whether round, square, or other shape.

It will be understood that various alterations in the details of construction and various modifications of the precise form of the invention herein illustrated may be made without departing from the spirit of the invention or scope of the appended claims.

What I claim is:

1. An infeed mechanism comprising a conveyor in the form of an endless series of articulated platform elements, certain of which are supported for displacement out of the plane of the conveyor, timing means arranged at a point intermediate the length of the conveyor to pass containers past said point in timed sequence, said conveyor being arranged to frictionally feed containers to said intermediate point and means for elevating said displaceable platform elements beyond said point for positive container feed.

2. An infeed mechanism comprising an infeed conveyor in the form of an endless conveyor chain having an endless series of links carrying platform elements, certain of said platform elements being supported for displacement out of the plane of said conveyor, a pocket wheel located intermediately of the length of said conveyor, said conveyor being adapted to frictionally deliver containers to said pocket wheel, and means beyond said pocket wheel for elevating said displaceable platform elements to provide positive container feed.

3. A device as claimed in claim 2 in which said displaceable platform elements are carried on pivotal arcuate arms, and said means for elevating said displaceable platform elements comprise stationary cam means to engage said arms upon conveyor travel to swing said arms on their pivots.

4. A device as claimed in claim 2 in which said pocket wheel is driven in rotation through a clutch mechanism releasable upon jamming of a container and means are provided for locking said pocket wheel against rotation upon release of said clutch.

5. In combination with a machine having a main feed conveyor, an infeed conveyor driven from said main feed conveyor and arranged to extend parallel thereto with the input end of the main feed conveyor and the discharge end of the infeed conveyor in side by side overlapping relation, said infeed conveyor comprising a conveyor chain having an endless series of links provided with platform elements, certain of said platform elements being supported for displacement up out of the plane of said infeed conveyor to form conveyor pusher elements, a timing device arranged intermediate the length of said infeed conveyor to admit containers therepast in timed relation to said main conveyor, said infeed conveyor being adapted to frictionally advance containers to said timing device, means for elevating said displaceable platform elements beyond said timing device to provide positive container feed therebeyond, and means to guide positively driven contianers off the discharge end of said infeed conveyor on to the input end of said main conveyor.

6. A device as claimed in claim 5 in which said guide means comprises a transfer rail of curved form extending from thes ide of the discharge end of said infeed conveyor remote from the main conveyor across said infeed conveyor to the adjacent side of the input end of said main conveyor, said transfer rail being adjustable transversely of the length of said conveyors.

7. A device as claimed in claim 5 in which said infeed conveyor is provided with longitudinal guide rails at the sides thereof and said timing device comprises a pocket wheel driven from said main conveyor and disposed opposite one of said guide rails and presenting projections between pockets, said projections being adapted to enter between containers being frictionally fed on said infeed conveyor to separate the foremost container arriving at said pocket wheel from following containers, said pocket wheel being slidably mounted for movement towards and from said latter guide rail to regulate the space between said latter guide rail and said pocket wheel projections in accordance with container size to prevent containres from passing through said space.

8. A device as claimed in claim 7 in which said pocket wheel is formed to present a pocket wall extending substantially parallel to said latter guide rail when the projection formed between said pocket and an adjoining pocket is disposed in closest proximity to said latter rail.

9. An infeed mechanism for a machine having a main conveyor comprising in combination with a main machine conveyor having an infeed end and means for driving said cnoveyor, an infeed conveyor disposed parallel to said main conveyor and having a discharge end in side by side overlapping relation to said main conveyor, means for driving said infeed conveyor from said main conveyor, means adjacent to the discharge end of said infeed conveyor for admitting containers being fed along said infeed conveyor onto said discharge conveyor end, means for operating said admitting means in synchronism with said main conveyor, said infeed conveyor carrying shiftably mounted elements normally lying in a position leaving the upper surface of said infeed conveyor substantially continuous to a position projecting above the plane of said upper surface, means located on the discharge side of said admitting means for actuating said elements into said projecting position for positive container feed at said discharge conveyor end, and guide means for transferring containers being positively fed by the discharge end of said infeed conveyor into the infeed end of said main conveyor.

10. A device as claimed in claim 9 in which said guide means comprises a transfer cam rail leading generally diagonally across the discharge end of said infeed conveyor from the side thereof remote from said main conveyor to the main conveyor, and means mounting said transfer rail for adjustable movement transversely of said conveyors.

11. A device as claimed in claim 9 in which said shiftably mounted elements comprise platform elements normally lying in the plane of the upper surface of said infeed conveyor and supported on swingably mounted curved downwardly depending cam arms carried by said infeed conveyor, and said means for actuating said shiftably mounted elements comprise cam means for engaging said arms and camming same upwardly under infeed conveyor movement.

12. A device as claimed in claim 9 in which said admitting means comprises a pocket wheel driven from said main conveyor drive, and guide rail means for said infeed conveyor with which said pocket wheel is adapted to cooperate in controlling admittance of containers to the discharge end of said infeed conveyor.

13. A device as claimed in claim 12 in which said main conveyor drive includes a drive shaft and said pocket wheel is carried on a slide for movement transversely of said infeed conveyor, said slide carrying a sprocket wheel slidably keyed on said drive shaft and chain means in driving connection between said sprocket wheel and said pocket wheel.

14. A device as claimed in claim 13 in which the driving connection to said pocket wheel comprises a first clutch member positively driven from said sprocket wheel and a second clutch member positively connected to said pocket wheel, said clutch members having cooperating means for driving interengagement and means urging said clutch members into driving interengagement, said cooperating interengagement means being adapted to disengage under excess torque transfer loads.

15. A device as claimed in claim 14 in which said first clutch is provided with a plurality of part-circular depressions wherein said second clutch is provided with rollers adapted to ride into and out of said depressions.

16. A device as claimed in claim 15 in which means are provided to lock said second clutch against rotation upon said rollers riding up out of said depressions.

17. A device as claimed in claim 16 in which said second clutch is provided with projecting teeth, and a correspondingly toothed stationary member is located to be engaged by said clutch teeth upon said rollers riding up out of said depressions.

18. A conveyor mechanism comprising an endless conveyor chain having an endless series of links carrying platform elements, certain of said elements being shiftably supported for displacement out of the plane of said conveyor, and means for shifting said shiftably supported elements, said shiftably supported elements having a predetermined relative spacing along the length of said conveyor.

19. A conveyor mechanism as claimed in claim 18 in which said shiftably supported platform elements are arranged for cam actuation on conveyor movement and said means for shifting said shiftably supported platform elements comprises cam means.

References Cited in the file of this patent

UNITED STATES PATENTS

| 1,209,801 | Beckett | Dec. 26, 1916 |
| 2,781,122 | Gueffroy | Feb. 12, 1957 |